(12) United States Patent
Sharratt et al.

(10) Patent No.: US 7,136,586 B2
(45) Date of Patent: Nov. 14, 2006

(54) OPTICAL COMMUNICATION SYSTEM

(75) Inventors: Michael Sharratt, Bramcote (GB); Harry R Claringburn, Nottingham (GB)

(73) Assignee: Marconi UK Intellectual Property Ltd., Coventry (GB)

( * ) Notice: Subject to any disclaimer, the term of this patent is extended or adjusted under 35 U.S.C. 154(b) by 200 days.

(21) Appl. No.: 09/780,683

(22) Filed: Feb. 8, 2001

(65) Prior Publication Data

US 2001/0040710 A1     Nov. 15, 2001

(30) Foreign Application Priority Data

Feb. 18, 2000   (GB)  .................. 0003752.3
Feb. 18, 2000   (GB)  .................. 0003771.3
Feb. 18, 2000   (GB)  .................. 0003772.1

(51) Int. Cl.
| | |
|---|---|
| H04J 14/02 | (2006.01) |
| H04B 10/02 | (2006.01) |
| H04B 10/16 | (2006.01) |
| H04B 10/17 | (2006.01) |
| H04B 10/24 | (2006.01) |

(52) U.S. Cl. .......................... 398/48; 398/82; 398/174; 398/175; 398/180

(58) Field of Classification Search ............... 398/3–5, 398/11–20, 32–34, 43, 45, 48–51, 84–85, 398/87, 116, 515, 202–204, 175
See application file for complete search history.

(56) References Cited

U.S. PATENT DOCUMENTS

| | | | | |
|---|---|---|---|---|
| 4,906,064 A | * | 3/1990 | Cheung ........................ | 385/16 |
| 5,319,485 A | * | 6/1994 | Yasui et al. .................... | 398/79 |
| 5,327,275 A | * | 7/1994 | Yamane et al. ................. | 398/2 |
| 5,353,146 A | * | 10/1994 | Webb .......................... | 398/175 |
| 5,875,054 A | * | 2/1999 | Onoda et al. ............. | 359/341.2 |
| 5,903,371 A | * | 5/1999 | Arecco et al. ................. | 398/4 |
| 5,953,141 A | * | 9/1999 | Liu et al. ...................... | 398/83 |
| 5,978,116 A | | 11/1999 | Wu et al. | |

(Continued)

FOREIGN PATENT DOCUMENTS

WO     WO 98/35251     8/1998

OTHER PUBLICATIONS

Ramaswami, R. and K.N. Sivarajan. Optical Networks: A Practical Perspective. San Francisco, California: Morgan Kaufmann Publishers, Inc., 1998.*

*Primary Examiner*—Kenneth Vanderpuye
*Assistant Examiner*—David S Kim
(74) *Attorney, Agent, or Firm*—Kirschstein, et al.

(57) ABSTRACT

The invention provides an optical communication system (10) comprising a plurality of mutually interconnected bi-directional optical waveguide rings (20, 30, 40, 50, 60) in which radiation modulated with communication traffic propagates. The radiation is partitioned into 32 distinct wavebands. Interfaces (70, 80, 90, 100, 110, 120) are included in the system (10) where communication traffic propagating in the rings transfers from one ring to another. Each interface (70) is capable of providing an all-optical waveband reconfigurable communication link between the rings (20, 30, 40, 50, 60). At each interface (70), conversion of optical radiation to corresponding electrical signals is not required when transferring communication traffic from one ring to another, thereby providing the system (10) with a potentially larger communication bandwidth compared to conventional optical communication systems. If required, the interfaces (70, 80, 90, 100, 110, 120) can include one or more of regenerative amplification (440, 850, 852, 854, 856, 858, 860, 862, 864) and wavelength-switching transponders (1332, 1410).

20 Claims, 8 Drawing Sheets

U.S. PATENT DOCUMENTS

| | | | |
|---|---|---|---|
| 6,023,359 A * | 2/2000 | Asahi | 398/5 |
| 6,067,389 A * | 5/2000 | Fatehi et al. | 385/17 |
| 6,201,788 B1 * | 3/2001 | Ishiwatari | 370/228 |
| 6,211,980 B1 * | 4/2001 | Terahara | 398/82 |
| 6,262,820 B1 * | 7/2001 | Al-Salameh | 398/12 |
| 6,285,812 B1 * | 9/2001 | Amundson et al. | 385/37 |
| 6,288,812 B1 * | 9/2001 | Duerksen | 398/9 |
| 6,304,347 B1 * | 10/2001 | Beine et al. | 398/38 |
| 6,317,232 B1 * | 11/2001 | Fee et al. | 398/9 |
| 6,411,407 B1 * | 6/2002 | Maxham | 398/173 |
| 6,445,720 B1 * | 9/2002 | Mukojima | 370/535 |
| 6,507,431 B1 * | 1/2003 | Sugaya et al. | 359/341.32 |
| 6,519,060 B1 * | 2/2003 | Liu | 398/49 |
| 6,519,255 B1 * | 2/2003 | Graves | 370/392 |
| 6,590,681 B1 * | 7/2003 | Egnell et al. | 398/82 |
| 6,614,567 B1 * | 9/2003 | Al-Salameh et al. | 398/79 |
| 6,619,865 B1 * | 9/2003 | Takai et al. | 398/68 |
| 6,751,372 B1 * | 6/2004 | Feuer et al. | 385/24 |

* cited by examiner

OPTICAL COMMUNICATION SYSTEM

BACKGROUND OF THE INVENTION

The present invention is concerned with an optical communication system, in particular, but not exclusively, with an optical communication system including interconnected optical communication rings. Moreover, the invention also relates to a method of operating such a system. Furthermore, the invention also relates to an interface for use in the system.

Conventional optical communication systems comprise nodes interconnected by optical fibre waveguides. Communication traffic is communicated between the nodes by conveying optical radiation through the waveguides, the radiation being modulated by the communication traffic. Optical radiation in the context of the present invention is defined as electromagnetic radiation within a free-space wavelength range from 560 nm to 2000 nm, although a free-space wavelength of substantially 1550 nm is a preferred part of this range.

Each node is operable to convert modulated radiation received thereat into corresponding electrical signals. Moreover, each node is further operable to convert electrical signals thereat into corresponding modulated optical radiation and emit the radiation into waveguides connected thereto. Electrical signals can be input and output from the nodes if required, for example to provide signals to clients connected to the nodes and to receive signals from the clients for transmission within the systems.

Examples of conventional optical communication systems including interfaces are to be found in the prior art and will now be described.

In a PCT published patent application PCT/SE96/01265, an optical cross-connect node architecture is described which is capable of interfacing a plurality of optical fibre input and output links, each link itself providing a plurality of wavelength division multiplexed (WDM) channels. In a first embodiment of the architecture elucidated, the input links are connected to an optical coupler. Pairs of tunable optical filters and optical wavelength converters are each connected to an output port of the optical coupler and perform wavelength channel routing and switching in the wavelength domain, namely without the need for any optical space switch. In a second embodiment of the architecture elucidated, an additional input wavelength converter is connected to each input fibre link to convert the plurality of wavelength channels on each link to different non-interfering wavelengths. Such conversion prevents wavelength contention in the optical coupler to which the input wavelength converters are connected. New fibre links may be added in modular fashion without significant impact on the pre-existing optical cross-connect structure. Similarly, new wavelength channels may also be multiplexed onto existing fibres to provide wavelength modularity without having to reconfigure the node.

In a U.S. Pat. No. 5,726,785, a multiplexer for use in optical telecommunications is described. The multiplexer is operable to add WDM optical radiation components to a group of existing WDM optical radiation components, the existing components having wavelengths belonging to a group of wavelengths $\lambda_1$ to $\lambda_N$. Moreover, the multiplexer is also operable to drop from the group of existing components at least one WDM optical component having a given wavelength chosen from within the aforementioned wavelength group. The multiplexer comprises at least one circulator having an optical input port for receiving the group of existing WDM components and an optical output port, and an optical selection means coupled on one side thereof to the circulator. The selection means comprises at least one photoinduced Bragg grating, the grating being associated with a corresponding wavelength. The grating can selectively switched between a first state and a second state. In the first state, the grating reflects a WDM radiation component having the given wavelength and transmits WDM radiation components having a wavelength different from the given wavelength. In the second state, the grating transmits all WDM radiation components. Means for controlling the selection means for switching it between the first and second states is provided. Moreover, the selection means cooperates with each optical circulator for adding and dropping the one or more WDM radiation components. Thus, U.S. Pat. No. 5,726,785 is primarily addressed at the problem of selectively routing WDM radiation components.

In a European patent application no. EP 0 862 071 A1, an optical branching device and a method of optical transmission is described. In the application, it is identified that, in an optical transmission system comprising an optical branching device for routing WDM radiation components, the number of radiation components can change or the intensity of the components can change for a number of reasons during operation. Such a system can include an output optical amplifier for compensating for such change to achieve a substantially constant output power. However, as the number of radiation components changes, the power of each of the remaining components will be modified by such compensation which often represents a departure from optimum device operating conditions. Thus, there is provided in the patent application an optical branching device comprising two optical circulators and plurality of optical fibre gratings arranged in series. The gratings are connected between the two optical circulators. Each grating is operable to reflect one or more radiation components having a wavelength different to the radiation components being transmitted. If a malfunction or similar disruption occurs, the device is operable to divert one or more radiation components different from the transmitted radiation components from a first node including the device to an auxiliary node remote from the terminal node, thus maintaining the radiation components transmitted through the first node to a prescribed power level and ensuring that, for example, the optical amplifier is operated at its optimum function point. Thus, the patent application EP 0 862 071 A1 is concerned with a problem of selectively diverting WDM radiation components to maintain optical working power levels when the number of components is dynamically changing in operation.

In another European patent application no. EP 0 926 853 A2, there is described a wavelength-selective add-drop multiplexer for adding and/or dropping spectral components from a WDM optical signal. 1×1 and 2×2 optical switches are included in the multiplexer; the switches are either used alone or in conjunction with other optical elements to separate WDM spectral components for dropping from other spectral components. The switches are disclosed as being micro-electromechanical actuators for positioning a reflective device into or out of a path of a spectral component for controlling its routing in the multiplexer. Thus, the patent application EP 0 926 853 A2 is concerned with addressing the problem of selective WDM spectral component routing within an optical communication system.

In a United Kingdom patent application GB 2 321 809 A, an add/drop multiplexer is described for coupling trunk and branch optical fibre waveguides in a WDM optical network.

The multiplexer selectively feeds particular carrier wavelengths $\lambda_1$, $\lambda_2$ from first and second trunk inputs to first, second and third trunk and branch outputs, and from a third branch input to the first and second branch outputs. WDM spectral components are selected by, for example, fibre Bragg gratings acting as reflecting filters, and routed via circulators. During such routing, the spectral components may be amplified by pumped bi-directional doped optical fibre amplifiers. Thus, the patent application GB 2 321 809 A is concerned with a problem of WDM spectral component routing and amplification.

In another European patent no. EP 0 720 408 A2, there is described a tunable add/drop optical filter providing arbitrary channel arrangements between two input WDM signals and two output WDM signals. The filter comprises two N-port wavelength grating routers (WGRs) connected by 2×2 optical switches in each WGR port branch. The switches can, for example, be opto-mechanical switches capable of switching in 50 ms. Thus, the patent application EP 0 720 408 A2 is concerned with selective routing of WDM signal spectral components.

In a scientific publication "Analysis of Hot-Potato Optical Networks with Wavelength Conversion", Bononi and Castanon, Journal of Lightwave Technology, Vol. 17, No. 4 April 1999, there is described a general analysis of WDM spectral component routing. However, practical hardware for performing such routing is not disclosed in the publication.

In the aforementioned conventional systems, the optical radiation propagating therein typically has a wavelength in the order of 1550 nm. This wavelength corresponds to a radiation frequency of around 200 THz and theoretically offers a maximum communication bandwidth in the order of 100 THz taking into consideration the Nyquist criterion, namely that carrier radiation must have a carrier frequency at least twice that of the highest frequency of a signal modulated onto the carrier radiation to circumvent aliasing and information loss. It is conventional practice, as elucidated in the foregoing, to partition radiation propagating in the conventional systems into wavebands, each waveband having associated therewith information-bearing radiation; such partitioning is known as WDM.

In practice, converting optical radiation into corresponding electrical signals at each node in conventional systems imposes a severe limitation on the communication bandwidth which can theoretically be provided by these systems. Such a limitation of bandwidth represents a serious first problem for the conventional systems.

In order to address the first problem, there has recently been theoretical studies concerning optical soliton wave propagation within optical systems. Such soliton waves are capable of propagating over relatively long distances through optical waveguides whilst suffering negligible dispersion and loss. It is not practicable to exploit soliton wave propagation in conventional optical communication systems on account of frequent conversions between modulated optical radiation and corresponding electrical signals which occur in such systems; these conversions negate any potential benefits from exploiting soliton propagation.

The inventors have appreciated that it is highly desirable in an optical communication system to perform as much processing as possible within the optical domain to address the first problem and only convert between optical radiation and corresponding electrical signals when absolutely necessary for performing specialist functions, for example signal regeneration. Regeneration is required for at least partially reversing the effects of dispersion which arise when optical signals are transmitted through relatively long lengths of optical fibre waveguide, for example 100 km lengths of optical fibre. The inventors have therefore devised a regenerative interface for a communication system, the interface capable of providing flexible re-routing of communication traffic whilst performing as much optical processing as possible; attempts so far in the prior art to provide an all-optical communication system have been frustrated by technical difficulties, particularly with regard to achieving all-optical reconfigurable radiation routing.

Moreover, the inventors have appreciated a second problem in conventional communication systems regarding bandwidth limitation arising from inefficient use of system wavebands. The inventors have realized that it is also desirable to be able to redistribute communication traffic within the system between wavebands to ensure that the system is capable of providing its full communication bandwidth in operation when heavily loaded with communication traffic.

Furthermore, the inventors have appreciated a third problem that it is highly desirable to be able to redistribute communication traffic within the system without having to convert information-bearing radiation into corresponding electrical signals which can represent a bandwidth limitation.

SUMMARY OF THE INVENTION

Thus, according to a first aspect of the present invention, there is provided an optical communication system comprising:
(a) first and second optical paths for guiding information-bearing optical radiation partitioned into wavebands;
(b) interfacing means for selectively communicating radiation components corresponding to one or more of the wavebands from the first path to the second path, the interfacing means comprising waveband selective diverting means and waveband selective coupling means, the diverting means being included in the first path and operable to divert radiation components corresponding to one or more of the wavebands from the first path to provide diverted radiation, and the coupling means being operable to couple one or more radiation components present in the diverted radiation to the second path, characterized in that the diverting means includes:
(c) waveband selective filtering means for separating at least part of the information-bearing radiation propagating along the first path into spatially separated rays, each ray corresponding to radiation of an associated waveband; and
(d) liquid crystal attenuating means associated with each ray for selectively directing radiation corresponding to the waveband of the ray, the directed radiation contributing to the diverted radiation provided to the coupling means.

The invention provides the advantage that the system is capable of addressing one or more of the aforementioned first, second and third problems.

The system is capable of communicating a selected part of the information-bearing radiation from the first path to the second path through the interfacing means using optical components present in the interfacing means without needing to convert radiation within the system into a corresponding electrical signal. Moreover, the system is also capable of providing re-routable regenerative connections from the first to the second path. Furthermore, the system is capable of waveband switching communication traffic conveyed therethrough and redirecting waveband shifted communication traffic selectively between paths within the system. The system addresses one or more of the problems by exploiting liquid crystal technology.

Preferably, the coupling means includes:
(a) waveband selective filtering means for separating at least part of the diverted radiation into spatially separated rays, each ray corresponding to an associated waveband; and
(b) liquid crystal attenuating means associated with each ray for selectively transmitting or diverting radiation corresponding to the waveband of the ray, thereby selectively providing radiation for output to the second path.

Such an implementation of the coupling means is convenient because the means can be purchased as a compact and cost effective unit from commercial suppliers, for example from specialist optical component suppliers in the USA, Canada and Japan.

Advantageously, for avoiding radiation of identical wavebands being added together resulting in a conflict, the second path includes waveband selective attenuating means for attenuating radiation of wavebands propagating along the second path, the coupling means operable to add radiation originating from the first path to radiation output from the attenuating means, the attenuating means operable to attenuate radiation of wavebands propagating along the second path coincident in wavelength with radiation added by the coupling means. Conveniently, when constructing the system in practice, it is preferable to implement the attenuating means such that it includes:
(a) waveband selective filtering means for separating the radiation propagating along the second path into spatially separated rays, each ray corresponding to radiation of an associated waveband; and
(b) liquid crystal attenuating means associated with each ray for selectively transmitting or diverting radiation corresponding to the waveband of the ray, thereby selectively providing radiation for adding to that from the coupling means for further propagation along the second path.

In communication systems, some wavebands are more heavily loaded with communication traffic than other wavebands. Thus, to even traffic loading between wavebands, it is convenient to be able to translate communication traffic from one waveband to another in the system. Hence, the waveband selective coupling means preferably includes waveband switching means for transferring information conveyed on a first set of the wavebands of the diverted radiation to a second set of the wavebands in the diverted radiation output to the second path.

The waveband switching means is implementable in a number of component architectures. In a first architecture, the waveband switching means comprises waveband selecting means for isolating radiation of a selected waveband in the diverted radiation, detecting means for converting the isolated radiation into a corresponding electrical signal, and an optical radiation source modulatable by the signal and operable to generate radiation bearing the signal and at a waveband mutually different to the selected waveband, the generated radiation for output to the second path. The first architecture is convenient to implement because it employs readily available optical components.

In a second architecture, it is desirable for achieving an uncompromised system bandwidth that the diverting means, the attenuating means and the coupling means operate on the information-bearing radiation in the optical domain to couple at least a part of the radiation from the first path to the second path without needing to convert any part of the radiation into a corresponding electrical signal and back to corresponding optical radiation. Thus, it is therefore preferable that the waveband switching means comprises waveband selecting means for isolating radiation of a selected waveband in the diverted radiation, and an optical radiation source biased substantially at its lasing threshold, the source being operable to be stimulated by the isolated radiation such that stimulated radiation generated by the source is modulated by information carried by the isolated radiation, the stimulated radiation being at a waveband mutually different to the selected waveband, the stimulated radiation for output to the second path.

When the information-bearing radiation is communicated over relatively longer distances, for example in excess of 20 km, radiation degradation can occur which is at least partially correctable by regeneration. Thus, it is preferable that the coupling means incorporates regenerating means for regenerating the diverted radiation propagating therethrough. In addition, regeneration in other parts of the system is also usefully performed, namely it is preferable that at least one of the paths incorporates regenerating means for regenerating the information-bearing radiation propagating therethrough.

In the system, it is advantageous that the paths support bi-directional radiation propagation therealong to provide security should the path become defective in one of its propagation directions, and also to distribute communication traffic more uniformly within the system. Thus, it is beneficial that the first and second paths are operable to support bi-directional radiation propagation therealong, and the interfacing means is operable to couple radiation of one or more of the wavebands propagating in either direction along the first path to the second path for propagation in either direction therealong.

Conveniently, the system includes one or more ring communication paths, for example a plurality of mutually interconnected ring paths. Preferably, the paths include one or more of linear paths and ring paths.

In some circumstances, it is advantageous to be able to redirect communication traffic associated with one or more selected wavebands from one direction along a path of the system to another direction therealong on order to distribute communication traffic load and also to achieve a shortest communication path from a transmitting node of the system to a receiving node thereof. Thus, it is beneficial that at least one of the paths of the system is operable to support bi-directional radiation propagation therealong, the at least one path including redirecting means for coupling radiation of one or more wavebands from a first direction of radiation propagation to a second direction of radiation propagation along the at least one path, the second direction being mutually oppositely directed to the first direction.

According to a second aspect of the present invention, there is provided an interface for an optical communication system comprising:
(a) first and second optical paths for guiding information-bearing optical radiation partitioned into wavebands, the interface operable to selectively communicate radiation corresponding to one or more of the wavebands from the first path to the second path,
(b) waveband selective diverting means and waveband selective coupling means, the diverting means being included in the first path and operable to divert radiation corresponding to the one or more of the wavebands from the first path to provide diverted radiation, and the coupling means is operable to couple radiation of one or more wavebands present in the diverted radiation to the second path, characterized in that the diverting means includes:
(c) waveband selective filtering means for separating at least part of the information-bearing radiation into spatially separated rays, each ray corresponding to radiation of an associated waveband; and
(d) liquid crystal attenuating means associated with each ray for selectively directing radiation corresponding to the waveband of the ray, the directed radiation contributing to the diverted radiation for the coupling means.

In a third aspect of the present invention, there is provided a method of communicating information-bearing radiation from a first path to a second path of the system according to the first aspect of the present invention, the method comprising the steps of:
(a) propagating the information-bearing radiation along the first path to interfacing means of the system;
(b) applying the radiation to diverting means of the interfacing means;
(c) separating at least part of the information-bearing radiation received at the diverting means into spatially separated rays, each ray corresponding to radiation of an associated waveband;
(d) receiving each ray at associated liquid crystal attenuating means and selectively diverting radiation at the attenuating means corresponding to one or more of the wavebands in the information-bearing radiation to provide diverted radiation; and
(e) coupling radiation of one or more wavebands of the diverted radiation through coupling means to the second path.

BRIEF DESCRIPTION OF THE DRAWINGS

Embodiments of the invention will now be described, by way of example only, with reference to the following diagrams in which.

DETAILED DESCRIPTION OF THE PREFERRED EMBODIMENTS

Figure 1:
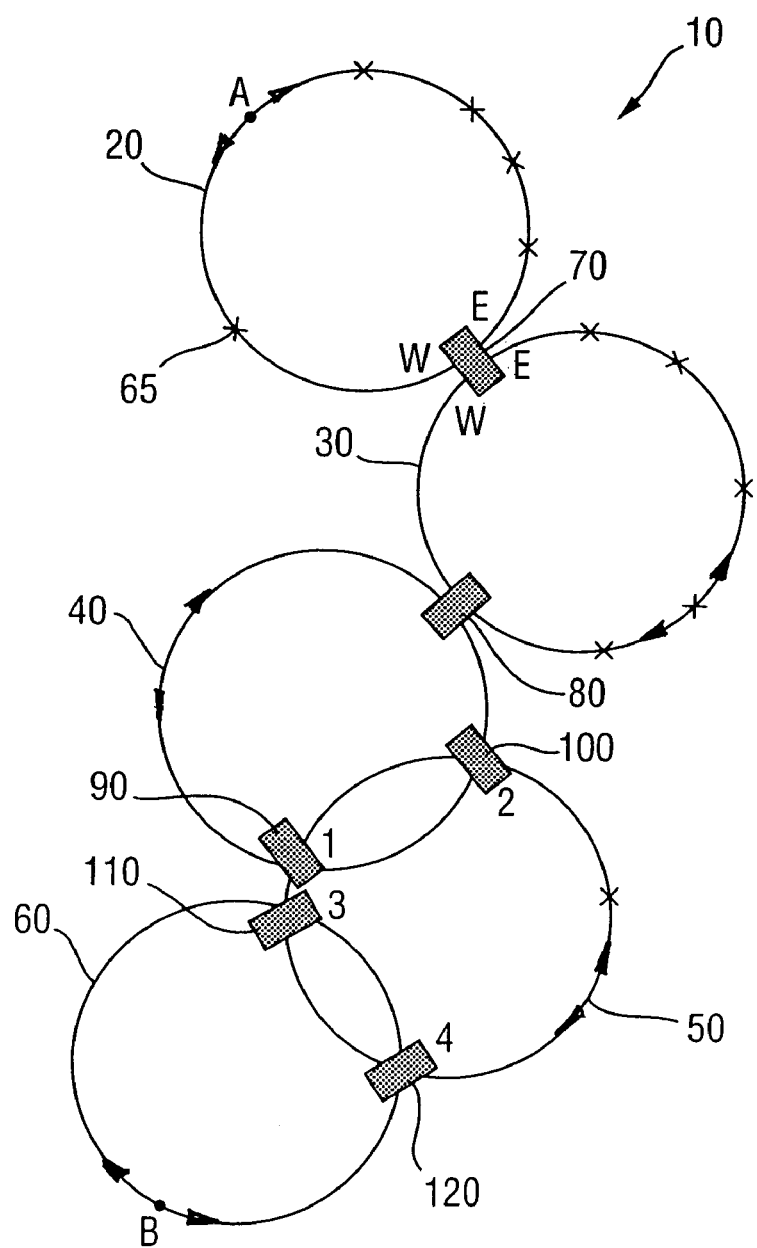
FIG. 1 is a schematic illustration of an optical communication system according to the invention comprising a plurality of mutually coupled bi-directional communication rings.

Referring now to FIG. 1, an optical communication system according to the invention is indicated generally by 10. The system 10 comprises five interlinked bi-directional optical communication rings 20, 30, 40, 50, 60. The rings 20, 30, 40, 50, 60 are of diameters in a range of 10 km to 100 km and are operable to provide communication links at national and regional level. The rings 20, 30 include repeater nodes, for example a repeater node 65, represented by crosses around the rings 20, 30. Moreover, the ring 20 is connected through an interface 70 to the ring 30. Likewise, the ring 30 is connected through an interface 80 to the ring 40. The ring 40 is connected at first and second positions thereon through interfaces 90, 100 respectively to the ring 50. Likewise, the ring 50 is connected at third and fourth positions thereon through interfaces 110, 120 respectively to the ring 60. The interfaces 70 to 120 are similar and will be described in more detail later.

Each of the rings 20 to 60 comprises two parallel optical fibre waveguide loops, a first of which conveys optical radiation in a clockwise direction around the ring and a second of which conveys optical radiation therethrough in an anticlockwise direction around the ring. Two loops are included within each ring for ensuring that the ring can continue to function in an event of one of the loops becoming defective, for example suffering a fibre break. Moreover, the two loops enable traffic to be allocated between the loops to ensure that the system 10 is optimally loaded with communication traffic.

Communication traffic is modulated onto optical radiation which propagates through the system 10. Each fibre loop of the rings 20 to 60 is operable to carry modulated optical radiation, the radiation comprising 32 distinct modulated radiation components corresponding to respective 32 communication channels. Each channel is separated from its neighboring channels by a wavelength difference of 0.8 nm; such a wavelength difference is equivalent to a channel frequency spacing of 100 GHz. Thus, each fibre conveys optical radiation nominally of 1550 nm wavelength comprising 32 channels spread over a wavelength range of substantially 25 nm.

Operation of the system 10 will now be described communicating communication traffic from a node A on the ring 20 to a node B on the ring 60; the system 10 is capable of communicating between other nodes therein, however nodes A, B are used here as an example. An electrical signal is received at the node A which converts it to corresponding optical radiation associated with one of the 32 channels. The radiation propagates from the node A through the repeater node 65 to the interface 70 and therefrom through the repeater nodes of the ring 30 to the interface 80. The radiation propagates from the interface 80 anticlockwise around the ring 40 to the interface 100. Next, the radiation propagates from the interface 100 around part of the ring 50 to the interface 120 through which it passes to the ring 60 and therearound to the node B. The node B receives the radiation and converts it into a corresponding electrical signal. Propagation of the radiation through the system 10 from node A to node B can be performed purely optically.

In the process of propagating from the node A to the node B, the radiation passes through a number of repeaters and interfaces which, although providing optical amplification, result in the radiation becoming degraded by attenuation and dispersion. Where possible, the system 10 includes regenerators and also phase dispersion and equalization correction units at its nodes. Such regeneration is preferably performed purely optically because conversion of the radiation to corresponding electrical signals for performing regeneration and then reconversion back to corresponding optical radiation is a bandwidth limiting constraint on the system 10.

Likewise, the phase dispersion and equalization corrections are also preferably performed purely optically. Where it is not possible to perform such regeneration and dispersion correction purely optically in the system 10, conversion to electrical signals and regeneration and dispersion correction in the electrical domain has to be performed.

Figure 2:
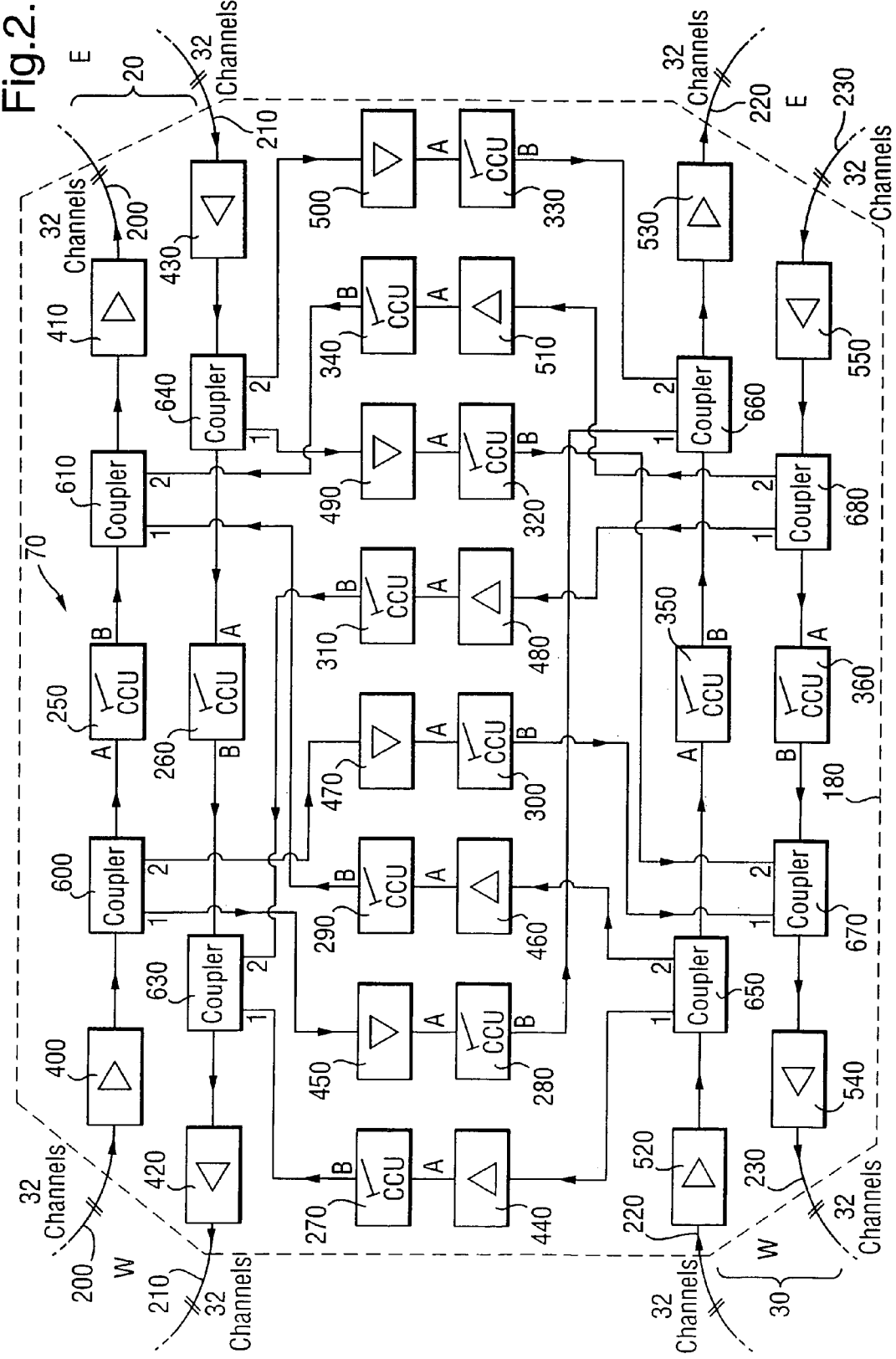
FIG. 2 is an illustration of a first type of optical interface of the system shown in FIG. 1, the interface connecting between two bi-directional communication rings and providing E-W direction connections from one ring to another.

Referring now to FIG. 2, there is shown a first type of optical interface included within the system 10, namely the interface 70 shown included within a dotted line 180. The ring 20 comprises a first clockwise fibre loop 210 through which radiation propagates in a direction from east (E) to west (W) through the interface 70. Moreover, the ring 20 comprises a second anti-clockwise fibre loop 200 through which radiation propagates in a direction from west (W) to east (E) through the interface 70. East (E) and west (W) directions here are used to indicate propagation direction in the diagrams and are unrelated to actual East-West geographical directions.

Likewise, the ring 30 comprises a first clockwise fibre loop 220 through which radiation propagates in a direction west (W) to east (E) through the interface 70. Moreover, the ring further includes a second fibre loop 230 through which radiation propagates in a direction from east (E) to west (W) through the interface 70.

The interface 70 includes twelve channel control units (CCU) 250 to 360 and associated optical amplifiers 400 to 550 interconnected as shown in FIG. 2; the optical amplifiers 440 to 510 are regenerative optical amplifiers which are selectable between providing purely optically amplified transmission therethrough and regenerative optically amplified transmission therethrough. The interface 70 further comprises fibre couplers 600 to 680 for coupling radiation from one fibre to another; the couplers are fabricated using optical fibre fusion splicing techniques although alternative types of couplers are useable in substitution, for example a form of coupler as described in a U.S. Pat. No. 4,950,045 incorporated herein by reference. On account of its complexity, the interface 70 is a relatively expensive item but provides great flexibility when selectively coupling optical radiation between the rings 20, 30. Where such flexibility is not required, the interface 70 can be simplified to reduce cost; such simplification will be described later. For example, one possible simplification involves substituting one or more of the regenerative amplifiers 440 to 510 with optical amplifiers identical to the optical amplifiers 400 to 430, 520 to 550.

Detailed interconnection of the couplers 600 to 680, the CCUs 250 to 360 and the optical amplifiers 400 to 550 will now be described with reference to FIG. 2. The couplers 600 to 680 are mutually similar. Moreover, the amplifiers 400 to 550 are also mutually similar, except that the amplifiers 440 to 510 include additional regeneration components. Furthermore, the CCUs 250 to 360 are mutually similar.

The fibre 200 of the ring 20 from the westerly (W) direction is connected to an input port of the amplifier 400. The amplifier 400 includes an output port which is connected through an optical fibre to the coupler 600 and therethrough to an input port A of the CCU 250. The CCU 250 comprises an output port B which is connected through an optical fibre to the coupler 610 and therethrough to an input port of the amplifier 410. The fibre 200 in an easterly (E) direction is connected to an output port of the amplifier 410.

Likewise, the fibre 210 of the ring 20 from the easterly (E) direction is connected to an input port of the amplifier 430. The amplifier 430 includes an output port which is connected through an optical fibre to the coupler 640 and therethrough to an input port A of the CCU 260. The CCU 260 comprises an output port B which is connected through an optical fibre to the coupler 630 and therethrough to an input port of the amplifier 420. The fibre 210 in a westerly (W) direction is connected to an output port of the amplifier 420.

Similarly, the fibre 220 of the ring 30 from the westerly (W) direction is connected to an input port of the amplifier 520. The amplifier 520 includes an output port which is connected through an optical fibre to the coupler 650 and therethrough to an input port A of the CCU 350. The CCU 350 comprises an output port B which is connected through an optical fibre to the coupler 660 and therethrough to an input port of the amplifier 530. The fibre 220 in an easterly (E) direction is connected to an output port of the amplifier 530.

Likewise, the fibre 230 of the ring 30 from the easterly (E) direction is connected to an input port of the amplifier 550. The amplifier 550 includes an output port which is connected through an optical fibre to the coupler 680 and therethrough to an input port A of the CCU 360. The CCU 360 comprises an output port B which is connected through an optical fibre to the coupler 670 and therethrough to an input port of the amplifier 540. The fibre 230 in a westerly (W) direction is connected to an output port of the amplifier 540.

The couplers 600 to 640 are connected to the couplers 650 to 680 through a series of connection chains, each chain comprising an optical amplifier and an associated CCU connected in series.

Connections from the ring 20 to the ring 30 will now be described. The coupler 600 includes first and second output ports. The first port of the coupler 600 is connected via an optical fibre through the amplifier 450 and then through the CCU 280 to a first input port of the coupler 660. Additionally, the second port of the coupler 600 is connected via an optical fibre through the amplifier 470 and through the CCU 300 to a first input port of the coupler 670. Moreover, the coupler 640 includes first and second output ports. The first port of the coupler 640 is connected via an optical fibre through the amplifier 490 and through the CCU 320 to a second input port of the coupler 670. Furthermore, the second port of the coupler 640 is connected via an optical fibre through the amplifier 500 and through the CCU 330 to a second input port of the coupler 660.

Next, connections from the ring 30 to the ring 20 will be described. The coupler 650 includes first and second output ports. The first port of the coupler 650 is connected via an optical fibre through the amplifier 440 and through the CCU 270 to a first input port of the coupler 630. Likewise, the second port of the coupler 650 is connected via an optical fibre through the amplifier 460 and then through the CCU 290 to a first input port of the coupler 610. Moreover, the coupler 680 includes first and second output ports. The first port of the coupler 680 is connected via an optical fibre through the amplifier 480 and then through the CCU 310 to a second input port of the coupler 630. Furthermore, the second port of the coupler 680 is connected via an optical fibre through the amplifier 510 and then through the CCU 340 to a second input port of the coupler 610.

Each CCU is capable of selectively attenuating radiation propagating therethrough corresponding to one or more of the 32 channels. Moreover, applying selective attenuation at the CCUs 250, 260, 350, 360 has the effect of diverting optical radiation to the couplers 600, 640, 650, 680 respectively preceding the CCUs. Such diversion also enables radiation to be added for the diverted channels at the couplers 610, 630, 660, 670 following the CCUs 250, 260, 350, 360 respectively.

In operation, the interface 70 is capable of providing purely optical paths between the rings 20, 30, such paths not being limited in bandwidth; however, bandwidth limitations arise when electrical regeneration is applied therebetween in one or more of the amplifiers 440 to 510. Moreover, the interface 70 is capable of coupling specific selected channels from the ring 20 and directing them in either direction around the ring 30. Furthermore, in a reciprocal manner, the interface 70 is capable of coupling specific selected channels from the ring 30 and directing them in either direction around the ring 20. In FIG. 2 and later diagrams, north (N), south (S), east (E) and west (W) are unrelated to geographical compass directions but are merely used for referring to directions on the diagrams.

In the communication system 10, it is not always necessary that its nodes provide the full connection functionality of the interface 70. When such extensive functionality is not required, the interface 70 can be simplified to reduce its complexity and cost by omitting some of the chains.

In the interface 70, regeneration and equalisation functions can be included within the aforementioned chains. It is preferable that such functions are performed optically if possible as this enables the benefits of soliton propagation within the system 10 to be realized. Optical equalization can be achieved using polarization dependent beam splitters and switched optical delay lines in a manner as described in a U.S. Pat. No. 5,859,939 which is incorporated herein by reference.

Although optical regeneration is to be preferred in the system 10, electrical regeneration and equalization can alternatively be employed therein although such regeneration and equalization potentially imposes a bandwidth limitation on the system 10 and prevents the benefits, for example, from soliton propagation within the system 10 from being realized. Optical or electrical regeneration can, if required, be implemented in the repeater nodes around the rings 20, 30 in addition to, or in substitution for, regeneration within the interface 70.

In practice, commercially available optical amplifiers, CCUs and optical couplers can be connected together to construct the interface 70. For example, the optical amplifiers 400 to 550 are preferably proprietary units which incorporate optically-pumped erbium-doped super-fluorescent optical fibres as active optical gain components. Likewise, the CCUs 250 to 360 are commercially available from vendors in the United States, for example CCUs are commercially available in units, each unit comprising a pair of CCUs. Each incorporates optical gratings, a matrix of liquid crystal apertures functioning as variable optical attenuators and free-space optical paths to achieve a compact construction and a low minimum insertion loss in the order of 6 dB from the CCU optical input port to the CCU optical output port when its attenuators are set to provide nominally zero attenuation. It is beneficial to the performance of the interface 70 to use such commercially available CCUs exhibiting low insertion losses in view of the number of CCUs employed within the interface 70; such low insertion loss CCUs reduce amplification requirements thereby improving system 10 signal-to-noise performance.

Figure 3:
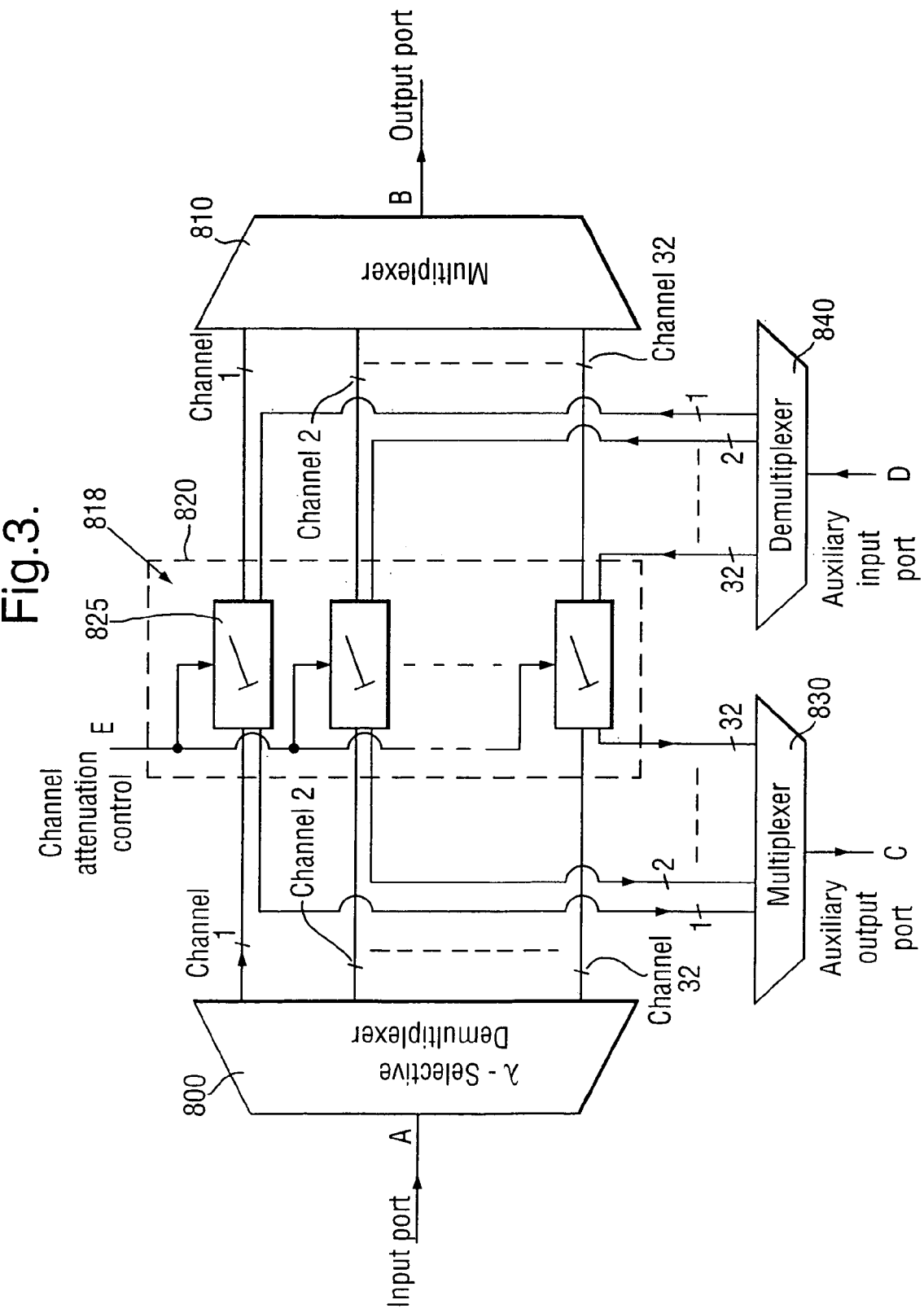
FIG. 3 is a schematic diagram of a channel control unit included within the optical interface illustrated in FIG. 2.

In order to further elucidate operation of the interface 70, the CCUs 250 to 360 will be described in further detail with reference to FIG. 3. In FIG. 3, there is shown an schematic representation of the CCU 250; the other CCUs 260 to 360 are similar in construction and performance to the CCU 250.

The CCU 250 includes an optical input port A for receiving radiation, an optical output port B for outputting radiation, an auxiliary optical output C, an auxiliary optical input D, and an electrical input port E for receiving electrical control signals for controlling operation of the CCU 250; the port E is, for example, used for receiving electrical signals for controlling attenuation settings of the attenuators. The CCU 250 comprises within it a demultiplexer 800, a multiplexer 810 and a matrix 818 of 32 liquid crystal attenuators shown included within a dotted line 820; an attenuator 815 is an example of one attenuator within the matrix 818. The demultiplexer 800 includes 32 optical outputs which are directed to convey radiation to their corresponding liquid crystal attenuators in the matrix 818. Outputs from the attenuators are directed to optical inputs of the multiplexer 810 which recombines radiation transmitted through the attenuators to provide output radiation at the port B. When the attenuators are set to attenuate radiation incident thereupon, the radiation is diverted towards a multiplexer 830 which is operable to combine the diverted radiation and provide a corresponding radiation output at the port C. Likewise, the port D is connected to a demultiplexer 840 which is operable to guide radiation input at the port D to the attenuators for propagating onwards to the multiplexer 810 for subsequent output at the port B. In the interface 70, the ports C and D of the CCUs are not normally used although they can be employed in special circumstances, for example when performing a wavelength shift to switch traffic from one channel to another; such a shift will be described later.

The attenuators are electronically controllable to provide an attenuation through each attenuator in a range of 0.1 dB to 30 dB. The CCUs, supplied by a vendor based in the USA, incorporated within the interface 70 use free-space optics to obtain a minimum insertion loss of 6 dB. If the CCU where not constructed using such free-space optics, for example using more conventional fusion-spliced fibre optics, optical losses through the demultiplexer 800 and the multiplexer 810 would be around 7.5 dB and 4.5 dB respectively resulting in a total minimum insertion loss of 12 dB. Moreover, commercially available CCUs for use in the interface 70 would be considerably more expensive and bulky were they not to employ such a compact free-space optical architecture.

The demultiplexer 800 is operable to filter composite radiation input at the port A into separate radiation components corresponding to each of the aforementioned 32 channels at 0.8 nm wavelength channel spacing. Thus, each attenuator can attenuate the radiation component corresponding thereto, thereby enabling each channel represented in radiation intput to the demultiplexer 800 to be selectively attenuated and diverted to the port C. In the interface 70, attenuation of a radiation component corresponding to a particular channel in the CCU 250 results in its radiation being diverted through the coupler 600 to its associated first and second output ports. A similar characteristic pertains to the CCUs 260, 350, 360 connected in-line in the rings 20, 30.

The CCUs 250 to 360 are controlled by electrical instructions sent thereto from a management control unit (not shown) tasked with routing communication traffic within the system 10 in response to client demand. The interface 70 is therefore designed to be highly reconfigurable thereby enabling communication traffic of any channels propagating in one of the rings to be selectively coupled to another of the rings in potentially both ring directions, namely in both directions of radiation propagation within the rings.

Figure 4:
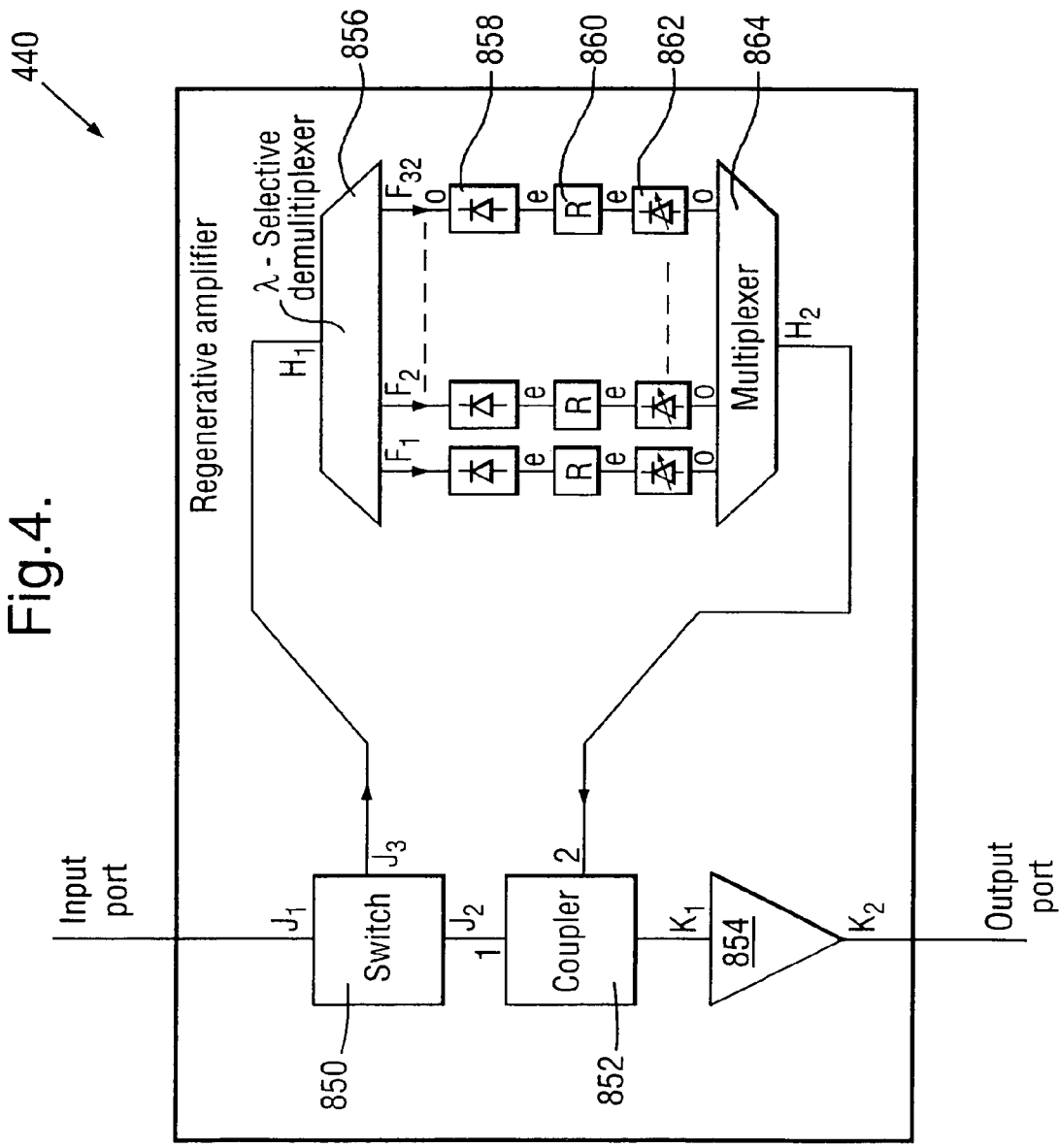
FIG. 4 is an illustration of a regenerative amplifier included within the optical interface illustrated in FIG. 2.

The regenerative amplifiers 440 to 510 will now be described with reference to FIG. 4. The amplifiers 440 to 510 are similar, hence only the amplifier 440 will be described in further detail. The regenerative amplifier 440 comprises an optical switch 850, a coupler 852, an optical amplifier 854, a waveband selective demultiplexer 856 including 32 outputs connected through mutually similar regenerating chains to a multiplexer 864. As an example, one of the chains comprises a detector 858, an electrical regeneration unit 860 and a modulated laser source 862. Each chain is connected at its output to a corresponding optical input of the multiplexer 864. The optical amplifier 854 is operable to provide non-regenerative optical amplification only.

Interconnection of component parts of the regenerative amplifier 440 will now be described. An input port of the amplifier 440 is connected to an optical input port $J_1$ of the optical switch 850. An output $J_2$ of the optical switch is connected through a first optical input port of the coupler 852 and therefrom through the coupler 852 to an input port $K_1$ of the optical amplifier 854. An output port $K_2$ of the amplifier 854 is connected to provide an optical output for the regenerative amplifier 440.

An output port $J_3$ of the switch 850 is connected to an optical input port $H_1$ of the demultiplexer 856. The demultiplexer 856 includes 32 optical output ports $F_1$ to $F_{32}$ at which radiation input to the optical port $H_1$ is output, each of the 32 outputs bearing radiation corresponding to a associated waveband of the system 10. Each of the 32 outputs is connected through its associated regeneration chain to a corresponding input of the multiplexer 864. An optical output port $H_2$ of the multiplexer 864 is connected to a second input port of the coupler 852 and therefrom through the coupler 852 to the input port $K_1$ of the amplifier 854.

Operation of the regenerative amplifier 440 will now be described with reference to FIG. 4. The input port $J_1$ receives radiation. Depending on how the switch 850 is programmed, it either:

(a) diverts the radiation through the coupler 852 for amplification in the amplifier 854 for subsequent output at the port $K_2$, thereby providing purely optical transmission through the amplifier 440; or
(b) diverts the radiation to the demultiplexer 856 which separates the radiation into associated radiation components corresponding to the wavebands; each component propagates through its associated chain in which regeneration occurs, and therefrom when regenerated to the multiplexer 864 which combines the regenerated radiation components received from the chains to provide regenerated radiation which is output at the port $H_2$ to the coupler 852; the coupler 852 couples the regenerated radiation to the optical amplifier 854 for optical amplification therein and subsequent output at the output port $K_2$.

Thus, the regenerative amplifier 440 is capable of selectively providing simple purely optical amplification or, alternatively, regenerative amplification.

Operation of the chains of the amplifier 440 will now be described in further detail. The detector 858 comprises a photodiode operable to convert optical radiation (o) received thereat into a corresponding electrical signal (e) at its electrical output. The regeneration unit 860 is operable to receive an electrical signal (e) comprising a serial stream of data, for example at a bit-rate of 10 Gbits/s, and submit it to hysteresis and synchronisation processes to make its data edges more closely resemble their original form. The source 862 is operable to receive an electrical signal (e) from its associated regeneration unit 860 and use it to modulate a laser tuned to output radiation at the waveband associated with the chain. Each of the chains of the amplifier 440 function in a similar manner except that each chain is arranged to output modulated radiation in a waveband corresponding thereto.

Figure 5:
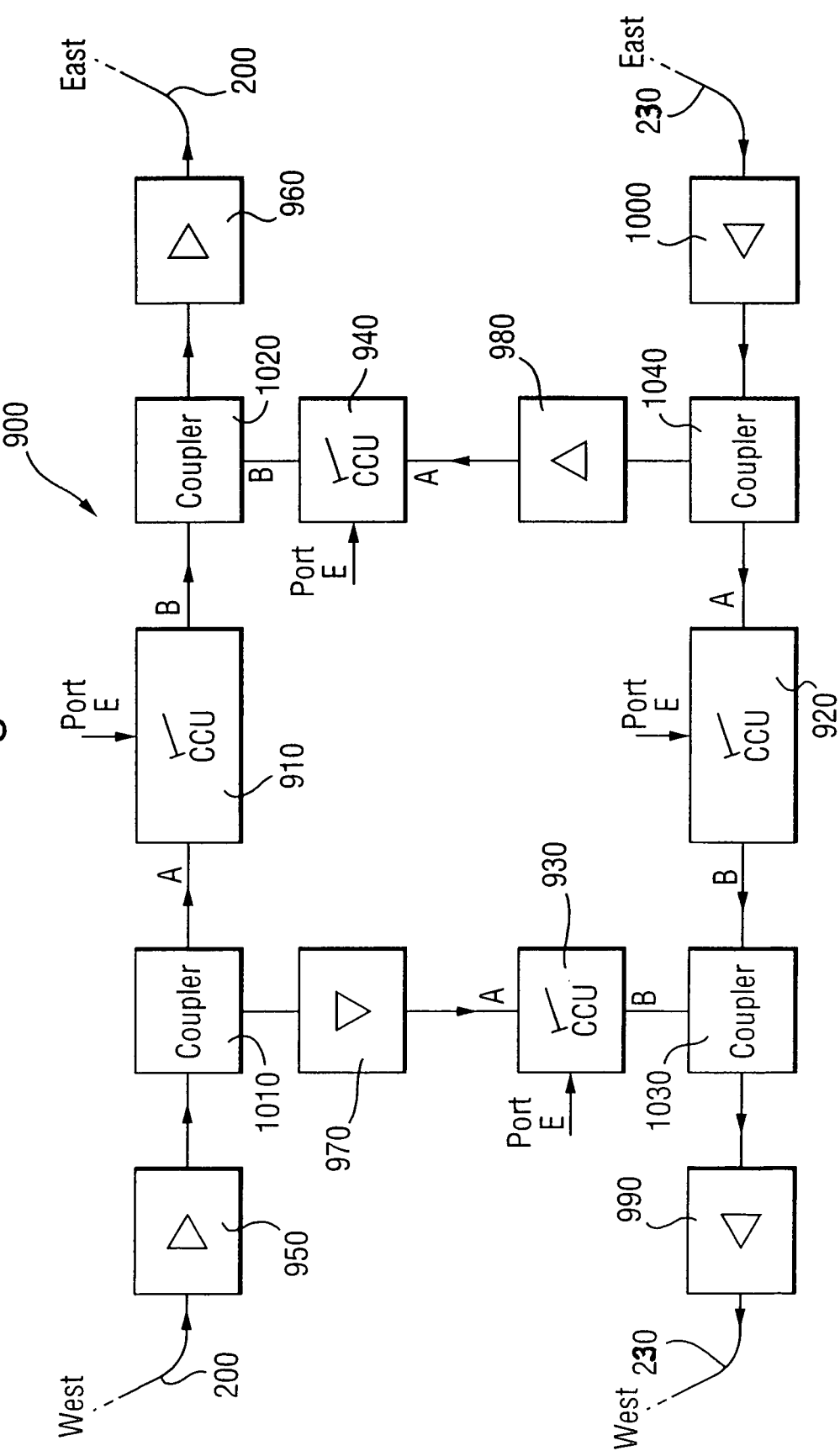
FIG. 5 is an illustration of a second type of optical interface of the system shown in FIG. 1, the connection providing connection between oppositely directed fibre loops of a bi-directional ring.

Although the interface 70 is capable of providing interconnection between bi-directional rings, for example between the rings 20, 30, there often arises a requirement to switch a particular channel within a bi-directional ring from one direction to another, for example from a clockwise loop of the ring to an associated anti-clockwise loop thereof. In order to achieve such a selective switching function, a simplified version of the interface 70 can be included in the ring. Such a simplified version of the interface 70 is illustrated in FIG. 5 and indicated generally by 900. The simplified interface 900 comprises four CCUs 910 to 940, six optical amplifiers 950 to 1000 and four fibre couplers 1010 to 1040. The CCUs 910 to 940 are each similar to the CCU 250. The amplifiers 970, 980 are of a type illustrated in FIG. 4 for selectively providing either purely optical amplification or regenerative amplification.

Interconnection of the CCUs, amplifiers and fibre couplers of the simplified interface 900 will now be described. The amplifiers 950, 960, the CCU 910 and the couplers 1010, 1020 are connected inline in the second fibre loop of the ring 20. A fibre 200 of the second loop in a westerly (W) direction is connected to an optical input of the amplifier 950. An optical output of the amplifier 950 is connected through an optical fibre to the coupler 1010 and therethrough to an optical input port A of the CCU 910. An optical output port B of the CCU 910 is connected through an optical fibre to the coupler 1020 and therethrough to an optical input of the amplifier 960. An optical output of the amplifier 960 is connected to the fibre 200 directed in an easterly (E) direction.

In a similar manner, the amplifiers 990, 1000, the CCU 920 and the couplers 1030, 1040 are connected inline in the first fibre loop of the ring 20. A fibre 230 of the first loop in an easterly (E) direction is connected to an optical input of the amplifier 1000. An output of the amplifier 1000 is connected through an optical fibre to the coupler 1040 and therethrough to an optical input port A of the CCU 920. An optical output port B of the CCU 920 is connected through an optical fibre to the coupler 1030 and therethrough to an optical input of the amplifier 990. An optical output of the amplifier 990 is connected to the fibre 230 directed in a westerly (W) direction.

The amplifier 970 and its associated CCU 930 are connected in series and are operable to provide a first chain selectively linking communication traffic from the second loop comprising the fibre 200 to the first loop comprising the fibre 230. Likewise, the amplifier 980 and its associated CCU 940 are operable to provide a second chain selectively linking communication traffic from the first loop to the second loop.

In operation, the simplified interface 900 can block, by virtue of the CCUs 910, 920, communication traffic associated with specific channels flowing within the loops and direct the traffic to a chain which can selectively transmit one or more of the channels depending upon instructions sent to the port E of its CCU. In general, the CCU 910 will be set to attenuate radiation of one or more channels which the CCU 930 is set to selectively transmit. Likewise, the CCU 920 will be set to attenuate radiation of one or more channels which the CCU 940 is set to selectively transmit. Thus, the interface 900 enables specific selected channels to be switched from propagating in one direction around the ring 20 to an opposite direction relative thereto. The interface enables the volume of communication traffic to be more equally distributed between the two loops of the ring 20, thereby enabling the system 10 to be more fully utilised. The interface 900 also provides one or more of optical amplification and regenerative amplification which assists to maintain optical radiation amplitude within the system 10.

When coupling communication traffic between rings in the system 10, and also when switching direction of selected channels within one or more rings of the system 10, it is frequently convenient to shift communication traffic from one channel to another along a particular loop or ring; this is often referred to as wavelength shifting. Wavelength shifting enables the channels of the system 10 to be fully utilized to carry communication traffic thereby assisting to optimize the traffic throughput capacity of the system 10.

Such wavelength shifting is preferably performed purely in the optical domain to avoid imposing bandwidth restrictions on the system 10; optical wavelength shifting can be achieved using optical heterodyne techniques in non-linear optical components capable of performing optical mixing. Alternatively, wavelength shifting can also be achieved by using optical radiation at a first frequency to pump a laser biased near its lasing threshold and tuned to output optical radiation at a second frequency, thereby enabling communication traffic modulated onto the radiation of the first frequency to be modulated onto radiation output from the laser at the second frequency; if the radiation of the first frequency corresponds to one channel of the system 10 and radiation of the second frequency to another channel, switching of traffic from one channel to another can be achieved.

Wavelength switching can also be performed by converting modulated radiation at a first wavelength associated with a specific channel of the system 10 to a corresponding electrical signal and then using the electrical signal to amplitude modulate a laser to output radiation amplitude modulated by the electrical signal at a second wavelength associated with another specific channel of the system 10. Such wavelength switching is often found to be required when coupling communication traffic from one ring of the system 10 to another thereof.

Figure 6:
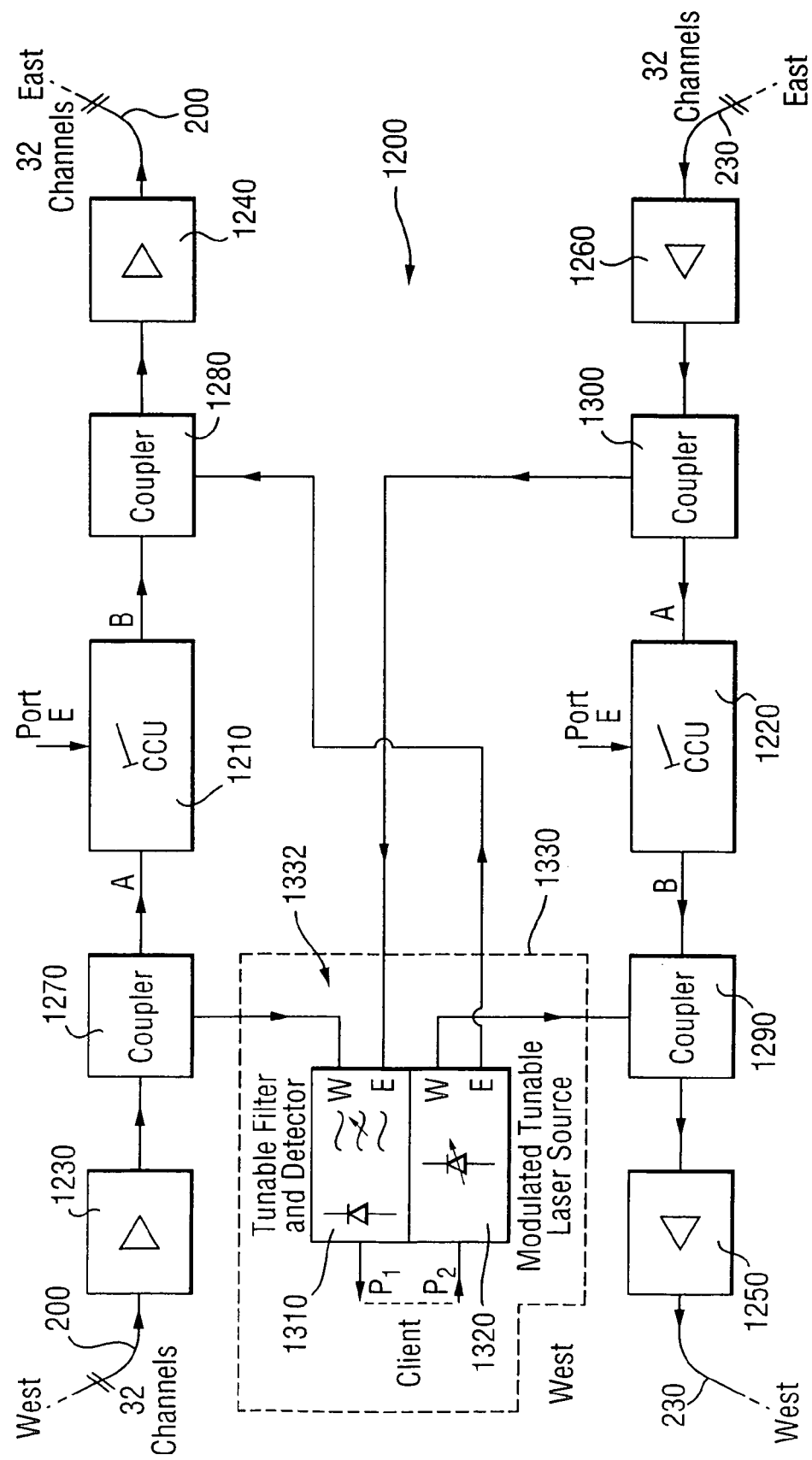
FIG. 6 is an illustration of a third type of optical interface connecting two communication rings of the system shown in FIG. 1.

Referring now to FIG. 6, there is shown a wavelength switching interface connecting two communication rings of the system 10. The interface is indicated generally by 1200 and comprises two CCUs 1210, 1220, four optical amplifiers 1230 to 1260, four optical couplers 1270 to 1300, a tunable filter and detector 1310, and a modulated tunable laser source 1320. Each of the two CCUs 1210, 1220 are similar to the CU 250 described earlier. The amplifiers 1230, 1240, the CCU 1210 and the couplers 1270, 1280 are connected into the second loop of the ring 20, the loop including the fibre 200. Likewise, the amplifiers 1250, 1260, the CCU 1220 and the couplers 1290, 1300 are connected into the first loop of the ring 30, the loop including the fibre 230. The tunable filter and detector 1310 and the source 1320 constitute a transponder shown within a dotted line 1330 and indicated by 1332 which is connected to the couplers and operable to wavelength shift a selected channel from one of the loops and output at another wavelength back onto the same loop or an alternative loop.

Interconnection within the interface 1200 will now be described. The fibre 200 of the second loop of the ring 20 from a westerly (W) direction is connected to an optical input of the amplifier 1230. An optical output from amplifier 1230 is connected to the coupler 1270 and therethrough to an optical input port A of the CCU 1210. An optical output port B of the CCU 1210 is connected via an optical fibre to the coupler 1280 and therethrough to an optical input of the amplifier 1240. The fibre 200 in an easterly (E) direction of the second loop is connected to an optical output of the amplifier 1240.

Likewise, the fibre 230 of the first loop of the ring 30 from an easterly (E) direction is connected to an optical input of the amplifier 1260. An optical output from amplifier 1260 is connected to the coupler 1300 and therethrough to an optical input port A of the CCU 1220. An optical output port B of the CCU 1220 is connected via an optical fibre to the coupler 1290 and therethrough to an optical input of the amplifier 1250. The fibre 230 in a westerly (W) direction of the first loop of the ring 30 is connected to an optical output of the amplifier 1250.

An optical output of the coupler 1270 is connected through an optical fibre to a first optical input (W) of the tunable filter and detector 1310. Similarly, an optical port of the coupler 1300 is connected through an optical fibre to a second optical input (E) of the filter and detector 1310.

An optical input of the coupler 1290 is connected through an optical fibre to a first optical output (W) of the laser source 1320. Similarly, an optical input port of the coupler 1280 is connected through an optical fibre to a second optical output (E) of the laser source 1320.

The tunable filter and detector 1310 includes a coupler to combine radiation received at its first and second ports, and also a tunable filter and a detector. It is operable to receive radiation, filter out radiation corresponding to a channel to be shifted and to detect the filtered radiation to generate a corresponding demodulated electrical signal which is provided to the output P1. The source 1320 includes a tunable laser for generating output radiation modulated by an electrical signal applied at the electrical input P2 of the source 1320. When the laser source 1320 is tuned to operate at a frequency which is mutually different from the filter frequency of the filter and detector 1310, frequency shifting of traffic between channels is achieved when the electrical signal output at P1 is injected at the input P2.

The CCU 1210 is operable to attenuate one or more selected channels included in radiation propagating around the second loop of the ring 20. Such attenuation diverts the attenuated radiation to the coupler 1270 and onwards to the first input of the filter and detector 1310. When the filter and detector 1310 is tuned to the wavelength of a channel attenuated at the CCU 1210, radiation propagates through to the detector and gives rise to an electrical signal at the output P1. The signal from the output P1 is directed to the input P2 and is operable to modulate radiation generated by the source 1320 which selectively outputs the modulated radiation at the first or second output depending upon instructions received from the management control unit (not shown). When the radiation is output at the second output of the laser source 1320, it propagates to the coupler 1280 and is coupled into the second loop to propagate further in an easterly (E) direction through the fibre 200 around the second loop of the ring 20. Conversely, when the radiation is output at the first output of the laser source 1320, it propagates to the coupler 1290 and passes therethrough to the amplifier 1250 and onwards in a westerly (W) direction along the fibre 230 of the first loop of the ring 30.

The CCU 1220 is also operable to selectively attenuate radiation corresponding to one or more selected channels propagating in the first loop of the ring 30 and direct the radiation through the coupler 1300 to the second input of the filter and detector 1310. The filter and detector 1310 are operable to isolate radiation components and detect them to generate a corresponding electrical signal at the output P1. The electrical signal, when directed to the source 1320, modulates the source 1320 to provide modulated radiation which is selectively directable to the ring 20 or to the ring 30.

The interface 1200 is thus capable of selectively shifting communication traffic from one channel to another. Moreover, it is further capable of receiving such traffic from either the ring 20 or the ring 30 and selectively outputting the traffic, when channel shifted, onto either the ring 20 or the ring 30. The interface is thus capable of performing flexible and reconfigurable frequency shifting and routing functions. If required, purely optical amplification or regenerative optical amplification as described with reference to FIG. 4 can be included after the east (E) and west (W) outputs of the source 1320.

Figure 7:
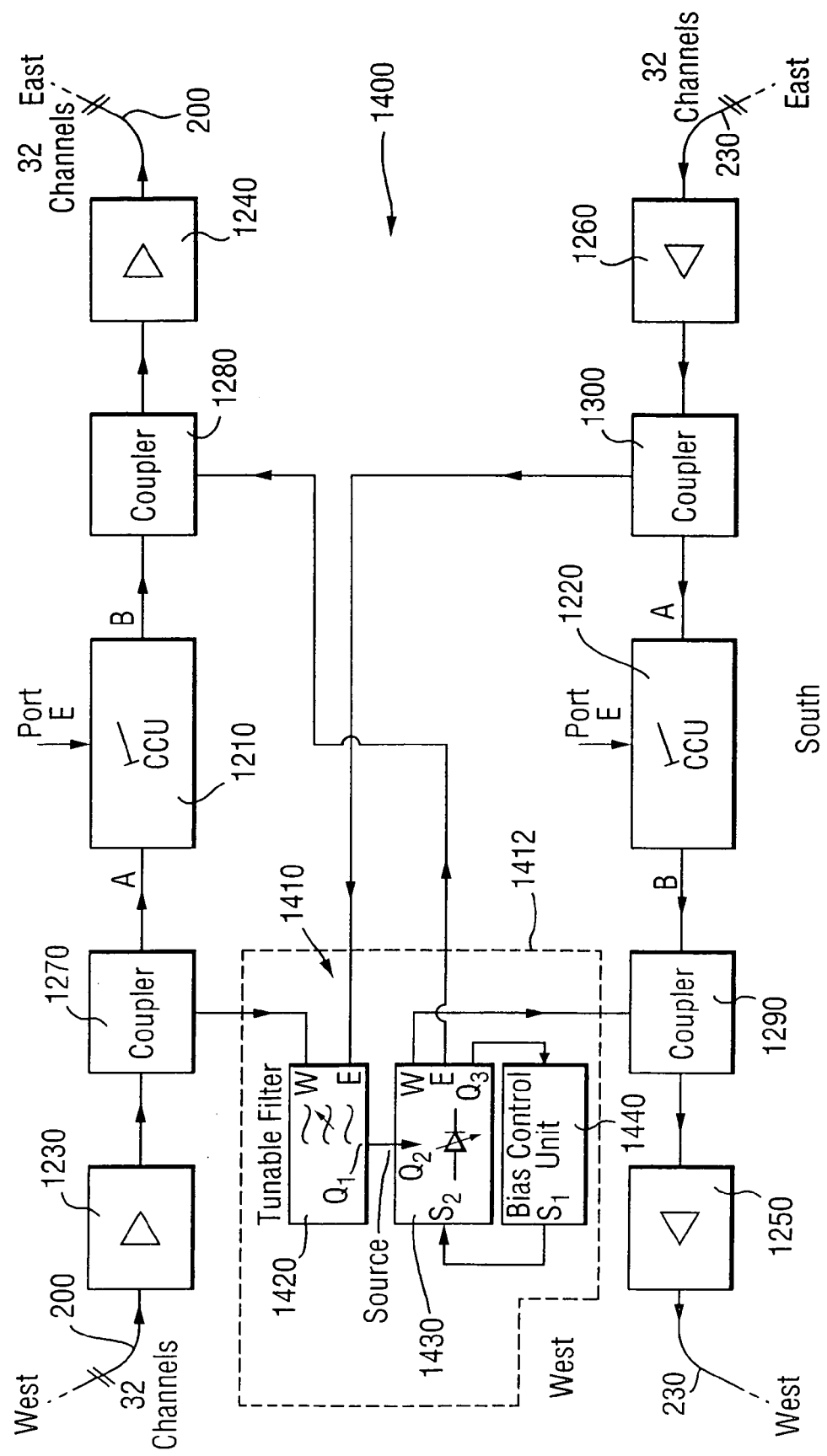
FIG. 7 is an illustration of a fourth type of optical interface connecting two communication rings of the system shown in FIG. 1.

Referring now to FIG. 7, there is shown indicated generally by 1400 an interface according to the invention. The interface 1400 is similar in function to the interface 1200 and includes parts present in the interface 1200 except that the transponder 1332 in the interface 1200 is substituted by a transponder indicated by 1410 in the interface 1400.

The transponder 1410 is shown in FIG. 7 included within a dotted line 1412. The transponder 1410 comprises a tunable filter 1420 including dual selectable input ports (E, W), a tunable laser source 1430, and a bias control unit 1440. An optical output port $Q_1$ of the filter 1420 is connected to an optical input $Q_2$ of the source 1430. Moreover, the source 1430 includes two optical output ports (E-W) and an optical monitoring port $Q_3$. The port $Q_3$ is connected to an input port of the bias control unit 1440. The unit 1440 also comprises an electric output $S_1$ which is connected to an electrical input $S_2$ of the source 1430.

Operation of the interface 1400 will now be described with reference to FIG. 7. Information bearing radiation partitioned into 32 wavebands propagates along the fibre 200 from a westerly direction to the amplifier 1230 which amplifies the radiation to provide corresponding amplified radiation which further propagates from the amplifier 1230 through the coupler 1270 to the CCU 1210. The CCU 1210 receives routing instructions from the management control unit (not shown) to divert radiation of one or more selected wavebands back through to the coupler 1270 and therefrom to the transponder 1410, namely to the W input port of the tunable filter 1420. The filter 1420 receives the diverted radiation by selecting its W input port under instruction from the management control unit. The filter 1420 then filters out radiation associated with a specific waveband to be frequency shifted, and subsequently outputs the filtered radiation at its output port $Q_1$. The filtered radiation is then used in the source 1430 as stimulating radiation for a tunable laser incorporated therein. The laser is tuned to a different wavelength than that of the filtered radiation. The filtered radiation stimulates emission from the laser to provide corresponding stimulated radiation which is selectively output, depending upon instruction from the management control unit, to either the W or E port of the source 1430. When the W port is selected, the stimulated radiation is diverted to the coupler 1290 and continues by propagating in a westerly direction along the fibre 230. Conversely, when the E port is selected, the stimulated radiation is diverted to the coupler 1280 and continues by propagating in an easterly direction along the fibre 200.

The bias control unit 1440 is operable to monitor the stimulated radiation from the laser. If the radiation is present but appears unmodulated, the unit 1440 interprets this as the laser being biased too strongly above its lasing threshold; the unit 1440 responds by reducing a laser bias current supplied at the $S_1$ output which, in turn, reduces current flowing through the laser. Conversely, if no radiation is present, the unit 1440 interprets this as the laser being biased too weakly below its lasing threshold; the unit 1440 responds by increasing the laser bias current supplied at the $S_1$ output which, in turn, increases current flowing through the laser.

The interface 1400 can also respond to information-bearing radiation propagating along the fibre 230 from an easterly direction where the radiation propagates to the amplifier 1260 which amplifies the radiation to provide corresponding amplified radiation. The amplified radiation propagates through the coupler 1300 to the CCU 1220. The CCU 1220 is instructed by the management control unit to divert radiation of one or more selected wavebands in the amplified radiation back to the coupler 1300 and therethrough to the E input port of the filter 1420. The filter 1420 is instructed by the management control unit to accept radiation at the E port. Processing of the selected wavebands of the radiation present at the E port occurs in the source 1430 as described above where corresponding shifted radiation can be output to either the fibre 200 in a easterly direction or to the fibre 230 in a westerly direction depending upon instructions sent from the management control unit.

Thus, in operation, the interfaces 1200, 1400 not only provide wavelength switching but also channel communication traffic rerouting not only in east and west directions but also in north and south directions; the north and south directions referred to here, in a similar manner to the east and west directions, are not related to geographical directions but merely used to refer to direction of propagation in the diagrams.

In the interfaces 1200, 1400, a plurality of the transponders 1332, 1410 can be included in parallel so that radiation of more than one waveband can be simultaneously shifted to other wavebands. Such a modification requires that the couplers 1270, 1300 should have multiple optical outputs, each output connected to a corresponding transponder. Likewise, the couplers 1280, 1290 should also have multiple optical inputs, each input connected to a corresponding transponder. If required, purely optical amplification or regenerative optical amplification as described with reference to FIG. 4 can be included after one or more of the east (E) and west (W) outputs of the sources 1320, 1430.

Figure 8:
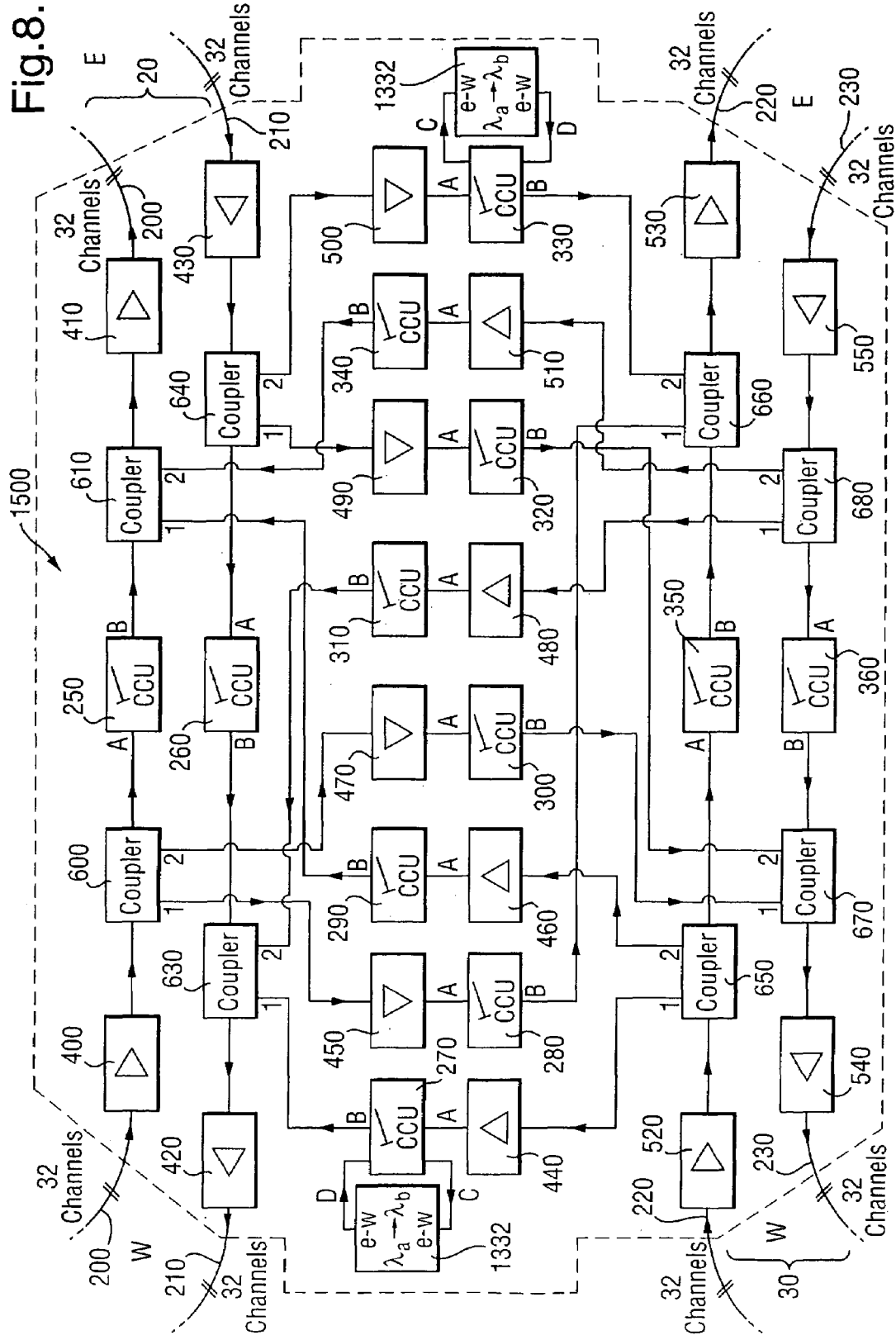
FIG. 8 is an illustration of wavelength switching performed around channel control units of an interface of the system shown in FIG. 1.

The transponder 1332 shown in FIG. 6 included within the dotted line 1330, or alternatively the transponder 1410 shown in FIG. 7 included within the dotted line 1412, can be included within the interface 70 illustrated in FIG. 1 to provide a modified interface according to the invention indicated generally by 1500 in FIG. 8. Such a modified interface 1500 not only provides a high degree of reconfigurable channel connection control but also enables communication traffic to be switched between channels to ensure that the system 10 is operating optimally to circumvent grossly unequal distribution of traffic between available channels.

Within the interface 1500, each transponder 1332 is connected with its filter and detector 1310 inputs coupled to its associated CCU optical output port C, and its source 1320 outputs coupled to its associated CCU optical input port D. Although transponders 1332 are illustrated coupled to the CCUs 270, 330 only, more transponders can be incorporated into the interface 1500 if necessary such that up to all the CCUs 270 to 340 have associated transponders 1332, 1410 capable of performing wavelength shifting of communication traffic directed therethrough.

It will be appreciated that modifications can be made to the system 10, and to the interfaces 70, 900, 1200, 1500 without departing from the scope of the invention. For example, although the system 10 is illustrated with a sending node A and a receiving node B, the system 10 can have a large number of sending and receiving nodes distributed generally therearound. The system 10 can be modified to include a combination of ring and linear communication paths interlinked by interfaces of a type included amongst the interfaces 70, 900, 1200, 1500 at various locations. Moreover, the interfaces 70, 900, 1200, 1500 can be simplified or made more complex as described above to suit particular system reconfiguration requirements. For example, the system 10 can be modified to include 100 bi-directional rings, each ring comprising 10 interfaces similar to the interface 900, the rings interconnected together through interfaces similar to the interface 1500. Furthermore, the system 10 can be modified to include optical fibre in its rings 20 to 60 capable of supporting soliton propagation so that greater communication distances can be served by the system without requiring additional regeneration and repeaters.

We claim:

1. An optical communication system, comprising:
   a) a first optical path for guiding information-bearing, first optical radiation partitioned into a plurality of wavebands;
   b) a second optical path for guiding information-bearing, second optical radiation partitioned into the same plurality of wavebands; and
   c) switchable interfacing means for selectively communicating at least one component of the first radiation corresponding to a selected waveband from the first path to the second path, the interfacing means including
      i) switchable waveband selective diverting means in the first path, for selecting and diverting said at least one component of the first radiation corresponding to said selected waveband from the first path to an entry point in the second path for guidance away from the entry point along the second path,
      ii) switchable waveband selective coupling means for selecting and coupling at least one component from the first radiation diverted by the diverting means to the entry point, the coupling means including waveband selective filtering means for spatially separating components of the first radiation, and liquid crystal attenuating means associated with each component of the first radiation for selectively transmitting or diverting said at least one component of the first radiation corresponding to said selected waveband to the entry point, and
      iii) switchable waveband selective attenuating means in the second path upstream of the entry point, for selectively blocking at least one component of the second radiation corresponding to said selected waveband coupled at the entry point.

2. The system of claim 1, wherein the diverting means includes waveband selective filtering means for spatially separating components of the first radiation; and wherein the diverting means also includes liquid crystal attenuating means associated with each component of the first radiation for selectively transmitting or diverting said at least one component of the first radiation corresponding to said selected waveband.

3. The system of claim 1, wherein the attenuating means includes waveband selective filtering means for spatially separating components of the second radiation; and wherein the attenuating means also includes liquid crystal attenuating means associated with each component of the second radiation for selectively transmitting or diverting the components of the second radiation relative to the second path.

4. The system of claim 1, wherein the diverting means, the attenuating means and the coupling means operate on the optical radiation in the optical domain.

5. The system of claim 1, wherein the coupling means includes waveband switching means for transferring information conveyed on a first set of components of the radiation diverted by the diverting means to a second set of components for guidance along the second path, the first set and the second set having different wavebands.

6. The system of claim 5, wherein the switching means includes waveband selecting means for isolating a component of a selected waveband in the first radiation diverted from the first path, detecting means for converting the isolated component into an electrical signal, and an optical radiation source modulated by the signal for generating radiation bearing the signal at a waveband different from the selected waveband for guidance along the second path.

7. The system of claim 5, wherein the switching means includes waveband selecting means for isolating a component of a selected waveband in the first radiation diverted from the first path, and an optical radiation source biased substantially at its lasing threshold and stimulated by the isolated component, for generating a stimulated component modulated by information carried by the isolated component at a waveband different from the selected waveband for guidance along the second path.

8. The system of claim 1, wherein the coupling means includes regenerating means for regenerating the radiation guided therethrough.

9. The system of claim 1, wherein each path is operative for guiding the respective radiation therealong, and wherein the interfacing means is operative for communicating said at least one component in one of the first path and the second path.

10. The system of claim 1, wherein each path includes a plurality of subpaths.

11. A switchable interface for an optical communication system having a first optical path for guiding information-bearing, first optical radiation partitioned into a plurality of wavebands, and a second optical path for guiding information-bearing, second optical radiation partitioned into the same plurality of wavebands, the interface being operative for selectively communicating at least one component of the first radiation corresponding to a selected waveband from the first path to the second path, the interface comprising:
   a) switchable waveband selective diverting means in the first path, for selecting and diverting said at least one component of the first radiation corresponding to said selected waveband from the first path to an entry point in the second path for guidance away from the entry point along the second path,
   b) switchable waveband selective coupling means for selecting and coupling at least one component from the first radiation diverted by the diverting means to the entry point, the coupling means including waveband selective filtering means for spatially separating components of the first radiation, and liquid crystal attenuating means associated with each component of the first radiation for selectively transmitting or diverting said at least one component of the first radiation corresponding to said selected waveband to the entry point, and
   c) switchable waveband selective attenuating means in the second path upstream of the entry point, for selectively blocking at least one component of the second radiation corresponding to said selected waveband coupled at the entry point.

12. The interface of claim 11, wherein the diverting means includes waveband selective filtering means for spatially separating components of the first radiation; and wherein the diverting means also includes liquid crystal attenuating means associated with each component of the first radiation for selectively transmitting or diverting said at least one component of the first radiation corresponding to said selected waveband.

13. The interface of claim 11, wherein the attenuating means includes waveband selective filtering means for spatially separating components of the second radiation; and wherein the attenuating means also includes liquid crystal attenuating means associated with each component of the second radiation for selectively transmitting or diverting the components of the second radiation relative to the second path.

14. The interface of claim 11, wherein the diverting means, the attenuating means and the coupling means operate on the optical radiation in the optical domain.

15. The interface of claim 11, wherein the coupling means includes waveband switching means for transferring information conveyed on a first set of components of the radiation diverted by the diverting means to a second set of components for guidance along the second path, the first set and the second set having different wavebands.

16. The interface of claim 15, wherein the switching means includes waveband selecting means for isolating a component of a selected waveband in the first radiation diverted from the first path, detecting means for converting the isolated component into an electrical signal, and an optical radiation source modulated by the signal for generating radiation bearing the signal at a waveband different from the selected waveband for guidance along the second path.

17. The interface of claim 15, wherein the switching means includes waveband selecting means for isolating a component of a selected waveband in the first radiation diverted from the first path, and an optical radiation source biased substantially at its lasing threshold and stimulated by the isolated component, for generating a stimulated component modulated by information carried by the isolated component at a waveband different from the selected waveband for guidance along the second path.

18. The interface of claim 11, wherein the coupling means includes regenerating means for regenerating the radiation guided therethrough.

19. The interface of claim 11, wherein each path is operative for guiding the respective radiation therealong, and wherein the interface is operative for communicating said at least one component in one of the first path and the second path.

20. The interface of claim 11, wherein each path includes a plurality of subpaths.

* * * * *

UNITED STATES PATENT AND TRADEMARK OFFICE
CERTIFICATE OF CORRECTION

PATENT NO. : 7,136,586 B2
APPLICATION NO. : 09/780683
DATED : November 14, 2006
INVENTOR(S) : Sharratt et al.

It is certified that error appears in the above-identified patent and that said Letters Patent is hereby corrected as shown below:

Title Pg, Item (58), under "Field of Classification Search", in Column 1, Line 3, after "116" delete "515".

In Column 6, Line 41, delete "on" and insert -- in --, therefor.

In Column 12, Line 10, delete "815" and insert -- 825 --, therefor.

In Column 12, Line 35, delete "where" and insert -- were --, therefor.

In Column 12, Line 51, delete "intput" and insert -- input --, therefor.

In Column 15, Line 50, delete "CU" and insert -- CCU --, therefor.

In Column 16, Line 32, delete "P1." and insert -- $P_1.$ --, therefor.

In Column 16, Line 34, delete "P2" and insert -- $P_2$ --, therefor.

In Column 16, Line 39, delete "P1" and insert -- $P_1$ --, therefor.

In Column 16, Line 39, delete "P2." and insert -- $P_2.$ --, therefor.

In Column 16, Line 48, delete "P1." and insert -- $P_1.$ --, therefor.

In Column 16, Line 48, delete "P1" and insert -- $P_1$ --, therefor.

In Column 16, Line 48, delete "P2" and insert -- $P_2$ --, therefor.

UNITED STATES PATENT AND TRADEMARK OFFICE
CERTIFICATE OF CORRECTION

PATENT NO. : 7,136,586 B2
APPLICATION NO. : 09/780683
DATED : November 14, 2006
INVENTOR(S) : Sharratt et al.

It is certified that error appears in the above-identified patent and that said Letters Patent is hereby corrected as shown below:

In Column 17, Line 1, delete "P1." and insert -- $P_1$. --, therefor.

Signed and Sealed this

Fourth Day of November, 2008

JON W. DUDAS
*Director of the United States Patent and Trademark Office*